United States Patent [19]

Müller

[11] 3,990,242
[45] Nov. 9, 1976

[54] MOTOR VEHICLE DRIVE SYSTEM

[76] Inventor: Theo Müller, Sonnmattstrasse 4, Munchenstein, Switzerland

[22] Filed: June 19, 1974

[21] Appl. No.: 480,877

[30] Foreign Application Priority Data
June 20, 1973 Germany............................ 2331564

[52] U.S. Cl.................................... 60/597; 60/280; 60/315
[51] Int. Cl.²........................................... F02G 5/00
[58] Field of Search............ 60/39.17, 39.33, 39.19, 60/597, 614, 615, 616, 617, 619, 624, 13 N, 280, 315

[56] References Cited
UNITED STATES PATENTS

| | | | |
|---|---|---|---|
| 2,375,006 | 5/1945 | Larrecq | 60/617 |
| 2,503,410 | 4/1950 | Pouit | 60/13 N |
| 2,585,968 | 2/1952 | Schneider | 60/608 |
| 2,806,347 | 9/1957 | Pertile | 60/315 |
| 3,007,302 | 11/1961 | Vincent | 60/614 X |
| 3,553,961 | 1/1971 | McReynolds | 60/280 |
| 3,807,168 | 4/1974 | Bachmann | 60/624 |

FOREIGN PATENTS OR APPLICATIONS
1,012,365  4/1952  France................................ 60/608

*Primary Examiner*—Ronald H. Lazarus
*Attorney, Agent, or Firm*—Haseltine, Lake & Waters

[57] ABSTRACT

A motor vehicle drive system in which an internal combustion engine is operatively connected to a gas turbine installation. A compressor is interposed between the engine and the turbine installation so as to receive directly the exhaust gases from the piston engine and thereby prevent the development of a back pressure upon the exhaust system.

8 Claims, No Drawings

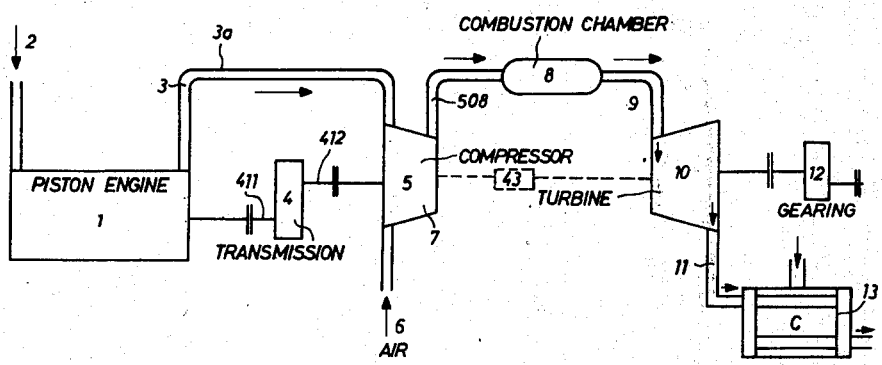

MOTOR VEHICLE DRIVE SYSTEM

BACKGROUND OF THE INVENTION

The present invention relates to a new and improved motor vehicle or power craft drive system.

Heretofore known motor vehicle drive systems encompass combustion engines, in particular two-stroke cycle or four-stroke cycle piston engines, especially Otto-cycle engines and Diesel engines. Rotary piston engines are only available to a limited extent as motor vehicle drive systems, and turbine drives as well as drive devices which encompass electric motors are still in the experimental stage and not yet commercially available.

In comparison to turbines combustion engines constructed as piston engines possess good efficiency and rapid load adaptability, but unfortunately deliver a large amount of noxious exhaust gases into the atmosphere.

Piston engines of the type where the fuel for operating the same contains lubricating oil are particularly environmental polluting.

According to the present available technology the prevailing means for overcoming the detrimental effects of the noxious exhaust gases, especially the exhaust gases of Otto-cycle engines, encompass catalytic devices or catalyzers generally possessing an afterburner in which, in particular, carbon monoxide gases which are extremely polluting to the environment are burned to produce carbon dioxide gases. The energy delivered to the gases due to the combustion process is, however, not recoverable. It is lost at the exhaust in the form of exhaust gases possessing increased heat content or thermal energy. Catalytic systems are also extremely expensive.

In comparison to piston engine power or drive systems the turbine drive systems exhibit poor efficiency, adapt their output quite poorly to load changes and produce hot exhaust gases. Since, however, combustion occurs with an excess of air the exhaust gases are less polluting to the environment.

Motor vehicles equipped with electro-motor drive systems possess heavy batteries which must be recharged much too often.

SUMMARY OF THE INVENTION

Hence, it is a primary object of the present invention to provide an improved power system for motor vehicles which is not associated with the aforementioned drawbacks and limitations of the prior art proposals.

Another object of the present invention aims at the provision of a new and improved construction of motor vehicle drive system which is relatively simple in construction and design and friendly to the environment.

Now in order to implement these and still further objects of the invention, which will become more readily apparent as the description proceeds, the motor vehicle drive or power system of this development is manifested by the features that there is provided a piston engine arrangement and a gas turbine installation which cooperates with the gas exhaust side of the piston engine arrangement, the exhaust gases of the piston engine arrangement are combustible in a combination chamber of the gas turbine installation.

The piston engine arrangement or device possesses a conventional motor vehicle engine connected in driving relationship with a compressor. The exhaust gases of the piston engine are delivered directly to the compressor. These exhaust gases especially contain polluting carbon monoxide.

Additionally fresh air is delivered to the compressor.

Consequently, in the compressor there is compressed a mixture of exhaust gases and fresh air.

This mixture is delivered from the compressor into the combustion chamber of the gas turbine installation, where it is burned in the presence of an excess of air. In this way there is insured that all of the carbon monoxide will be converted by combustion into carbon dioxide. These high-energy exhaust gases are then delivered to a turbine device which, in turn, is drivingly connected with the motor vehicle transmission system and accordingly carbon monoxide is not delivered to the surroundings.

The piston engine-compressor system predominantly operates at a constant rotational speed, whereby this system can be designed for maximum efficiency. In particular, the efficiency is greater in comparison to a compressor equipped with a gas turbine drive. Owing to the fact that the piston engine device can possess a lower rotational speed than the compressor these two devices can be drivingly connected with one another by means of a rotational speed-changing device.

The combustion chamber and turbine device possesses poor efficiency in comparison to the piston engine, but is advantageous in terms of the less polluting exhaust gases.

In order to reduce the exhaust gases emanating from the work turbine water can be injected into the combustion chamber.

Since a part of the thermal work cycle encompasses a piston engine which possesses relatively good efficiency the entire motor vehicle drive system, while delivering less polluting exhaust gases, possesses an efficiency which is improved in comparison to pure gas turbine drive systems.

BRIEF DESCRIPTION OF THE DRAWINGS

The invention will be better understood and objects other than those set forth above, will become apparent when consideration is given to the following detailed description thereof. Such description makes reference to the annexed drawings wherein the figures schematically illustrate exemplary embodiments of power vehicle or craft drive system designed according to the invention.

Figure 1:
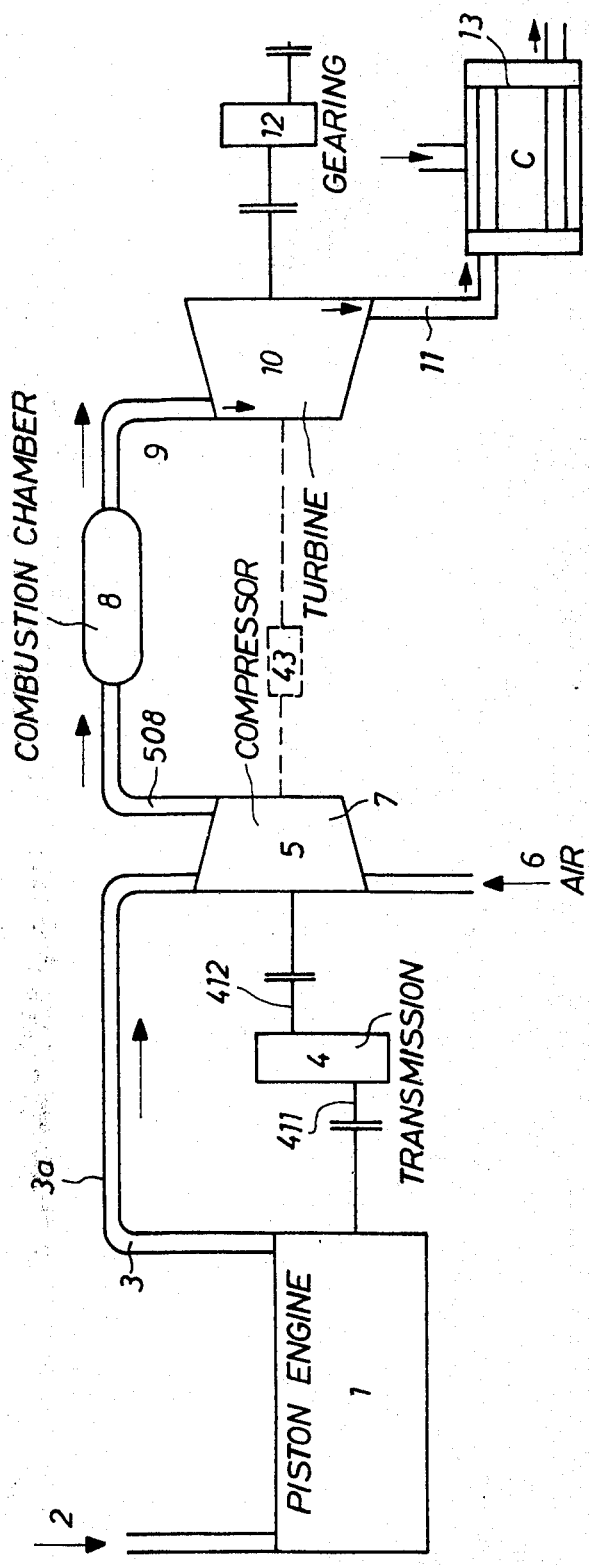
Figure 2:
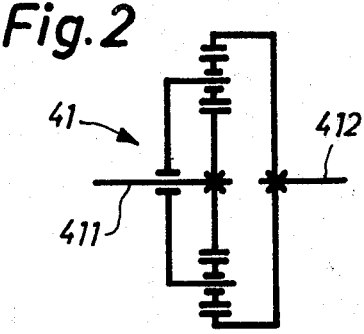
Figure 3:
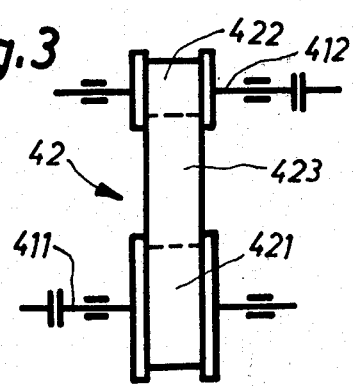
Figure 4:
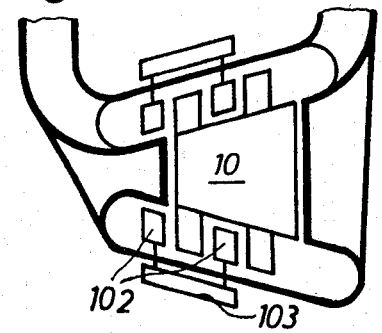
Figure 5:
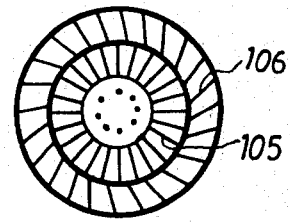
Figure 6:
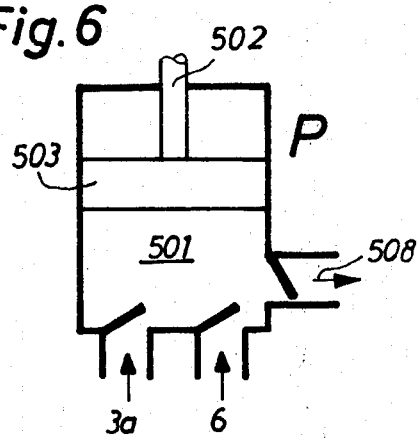
Figure 8:
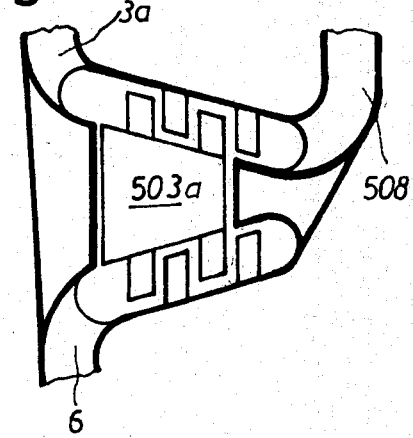
Figure 7:
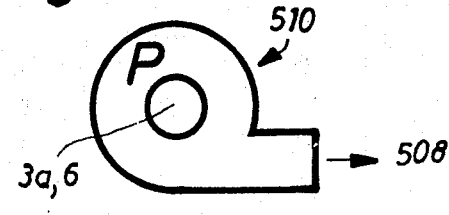

Brief explanation of the drawings:

FIG. 1 shows schematically an exemplary embodiment of a power vehicle or craft drive system embodying the invention, FIG. 2 shows schematically an embodiment of the transmission, FIG. 3 shows schematically a further embodiment of the transmission, FIG. 4 shows schematically an embodiment of the turbine with movable guide blades, FIG. 5 shows a section through the turbine, FIG. 6 shows an embodiment of the compressor, FIG. 7 shows a further embodiment of the compressor, FIG. 8 shows yet a further embodiment of the compressor.

DETAILED DESCRIPTION OF THE PREFERRED EMBODIMENTS

Describing now the drawing, there is illustrated therein an exemplary embodiment of power vehicle or craft drive system, hereinafter conveniently referred to as motor vehicle drive system, as contemplated by the invention, and specifically reference numeral 1 schematically portrays a piston engine or piston engine device to which there flows fresh air, as schematically illustrated by the fresh air infeed means 2, and which engine delivers exhaust gases 3 via the conduit 3a. The piston engine 1 is connected in driving relation with a compressor 5 by means of a transmission or gearing 4. The input shaft to the gearing 4 is designated with the reference numeral 411 and the output shaft is designated with the reference numeral 412. The exhaust gases 3 of the piston engine 1 are delivered via the conduit 3a to the compressor 5. Air is delivered to the compressor 5 by means of an air intake conduit 6 and exhaust gas/air mixture 7 is compressed in the compressor 5 and burned in a combustion chamber or compartment 8. The exhaust gas/air mixture is led via a conduit 508 from the compressor 5 to the combustion chamber or compartment 8. Exhaust gases 9 of the combustion chamber 8 are delivered to a power turbine 10 and ejected via the exhaust line or conduit 11. Conduit 11 is connected to a surface condenser 13. The power turbine 10 is connected through the agency of a conventional change-over or drive-train gearing system 12 with the drive wheels of the motor or power vehicle.

The piston engine device can be an Otto-cycle engine or a Diesel-cycle engine. Such can be constructed as a two-stroke cycle or four-stroke cycle engine.

Also it can be a rotary piston engine which would be particularly suitable with respect to a rotationally movable or turbine compressor device respectively, especially as its drive mechanism.

The compressor can be a single- or double- acting piston compressor as shown in FIG. 6 as compressor 501. It features the intake 3a for the exhaust gases of the piston engine 1 as well as an air the air intake conduit 6 for fresh air. The mixture consisting of exhaust gases and fresh air is fed into the conduit 508 leading to the combustion chamber 8. In this case such could be arranged at the engine block of the piston engine, and the connecting rods 502 of the compressor pistons 503 can be articulated with the crank shaft of the piston engine.

The compressor can also be designed as a rotary displacement compressor.

Such could be directly connected with the drive motor or engine or also with the drive engine through the agency of the speed converter 4, for instance a belt drive 42, (see FIG. 3) operating with disks 421, 422 possessing two different diameters and being drivingly connected by means of a belt 423. One disk 421 would be connected with the input shaft 411 and the other disk 422 with output shaft 412. Further, speed converter 4 would be a gear transmission, for instance a planetary gear 41 shown schematically in FIG. 2.

Furthermore, the compressor can be a turbine compressor centrifugal compressor 510 (shown in FIG. 7), or the axial compressor 503a (shown in FIG. 8). The drive of the turbine compressor can be realized by means of the belt drive 42 or gear transmission, for instance the planetary gearing 41.

A further transmission device or gearing device can be drivingly arranged between the compressor and the working turbine, this device then would possess a free-wheeling system 43. Consequently, the compressor drive system, in the event of malfunction of the combustion chamber or the gas turbine, could be used during an emergency for driving the motor vehicle, similar to present-day motor vehicles which, in the event of an emergency, can be moved with the starter battery (for instance in the event that the engine quits when the vehicle is located at a railroad crossing).

Furthermore, a condenser 13 can be connected behind the work turbine. In this way, on the one hand, there can be reclaimed the water which is injected into the combustion chamber and, on the other hand, the exhaust gases can be still further cooled.

Moreover, the combustion chamber can possess a catalytic system by means of which there is assisted the combustion of the exhaust gases of the piston engine drive device.

Since a power vehicle cannot be braked by means of a conventional gas turbine, it is possible to arrange a further braking bucket rim 106 at the drive bucket or a blade rim 105 of the turbine wheel. Such further braking bucket or blade rim can be constructed to be impinged in a manner to deliver work which opposes the drive rotational sense, and the gases leaving the combustion chamber, in the event of a desired braking effort, are delivered to the braking bucket rim by means of a gas flow-change mechanism.

As shown in FIG. 4 the gas turbine 10 can possess moveable guide blades 102 connected to a suitable control mechanism 103.

While there is shown and described present preferred embodiments of the invention, it is to be distinctly understood that the invention is not limited thereto, but may be otherwise variously embodied and practiced within the scope of the invention.

What is claimed is:

1. A motor vehicle drive system comprising a constant-rotational speed-type internal combustion piston engine having a drive axle, a gas-delivery side including fuel inlet means, and means for discharging exhaust gases; a gas-turbine installation operatively connected for cooperation with said gas-delivery side to said discharging means, provided with a compressor driven by said engine and connected to said discharging means so as to directly receive the combusted gas therefrom, means for connecting the outlet of said compressor with the inlet of a combustion chamber, the latter receiving the partly combusted exhaust gases, mixed in said compressor with some air, for further combustion of this mixture, and a turbine linked to the exhaust of said combustion chamber, to expand therein and to generate driving power; and a drive-train gearing devoid of mechanical interconnection with said engine, driven by said turbine and connected to said drive axle of the vehicle.

2. The motor vehicle drive system as defined in claim 1, further comprising means for mechanically drivingly connecting said compressor with said engine, said compressor being non-mechanically drive-connected with an impeller of said gas-turbine installation.

3. The motor vehicle drive system as defined in claim 1, comprising means for delivering the air to the exhaust gas of said piston engine.

4. The motor vehicle drive system as defined in claim 1, further comprising means for drivingly connecting said compressor with said engine for speed compensation therebetween.

5. The motor vehicle drive system as defined in claim 4 further comprising means for adding the air to the exhaust gases of said piston engine upstream of said compressor.

6. The motor vehicle drive system as defined in claim 4, wherein said connecting means is in the form of a belt drive mechanism.

7. The motor vehicle drive system as defined in claim 4, wherein said connecting means includes gearing means.

8. The motor vehicle drive system as defined in claim 7, wherein said gearing means includes a planetary gearing.

* * * * *